(12) United States Patent
Rowlett

(10) Patent No.: US 6,468,066 B1
(45) Date of Patent: Oct. 22, 2002

(54) WEAR RESISTANT INSERT FOR BALLING DRUM ASSEMBLY

(75) Inventor: Don C. Rowlett, Bedford, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/826,051

(22) Filed: Apr. 4, 2001

(51) Int. Cl.[7] .............................................. B29C 67/02
(52) U.S. Cl. ........................ 425/196; 425/222; 366/313
(58) Field of Search ................................. 425/196, 222; 366/313

(56) References Cited

U.S. PATENT DOCUMENTS

| | | | | |
|---|---|---|---|---|
| 3,316,585 A | | 5/1967 | Källberg | 425/222 |
| 3,497,911 A | * | 3/1970 | Dickie | |
| 3,787,161 A | * | 1/1974 | Frye et al. | 425/222 |
| 4,655,701 A | * | 4/1987 | Moriya | 425/222 |
| 4,694,918 A | * | 9/1987 | Hall | 175/329 |
| 4,881,887 A | * | 11/1989 | Holley | 425/222 |

FOREIGN PATENT DOCUMENTS

SU 1560301 A1 * 4/1990

* cited by examiner

*Primary Examiner*—Robert Davis
(74) *Attorney, Agent, or Firm*—Larry R. Meenan

(57) ABSTRACT

The present invention relates to a balling drum assembly including a wear resistant insert. The balling drum assembly includes an inclined rotary drum member having an inlet at its one end for receiving agglomerative material and at its other end an outlet for balls formed from the agglomerative material. At least one scraper blade assembly is operatively attached to the drum member parallel to the axis of rotation of the drum member. Each scraper blade assembly includes a blade support member and separate blade segments secured eccentrically to the blade support member with respect to the axis of rotation of the drum member. Each blade segment includes a wear resistant insert.

19 Claims, 4 Drawing Sheets

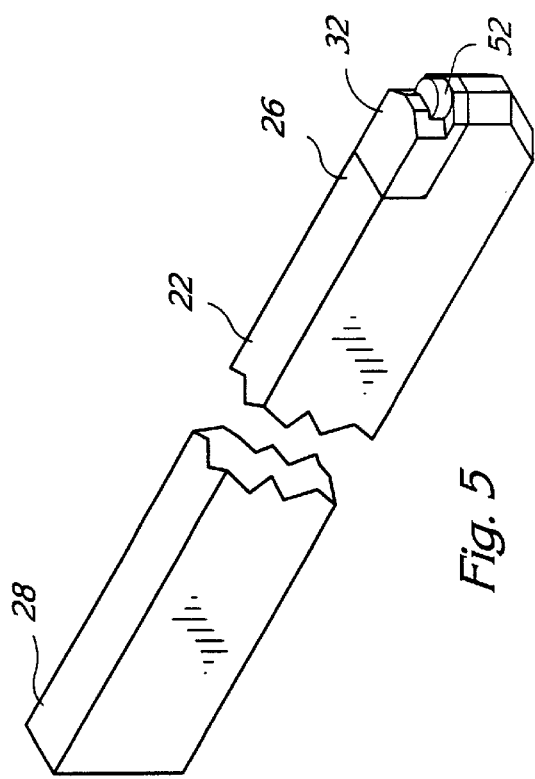
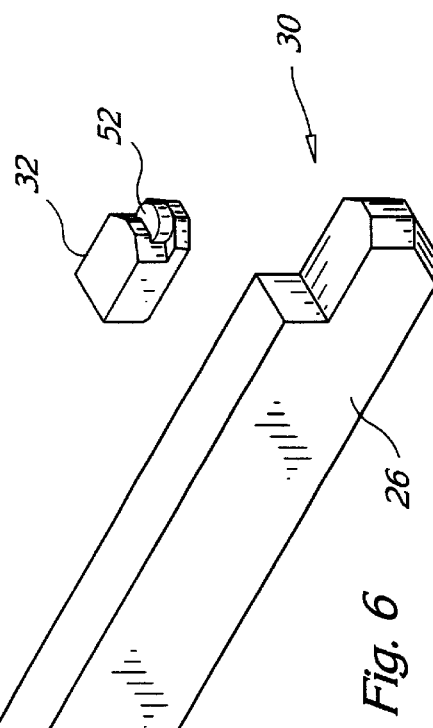
Fig. 5
Fig. 6

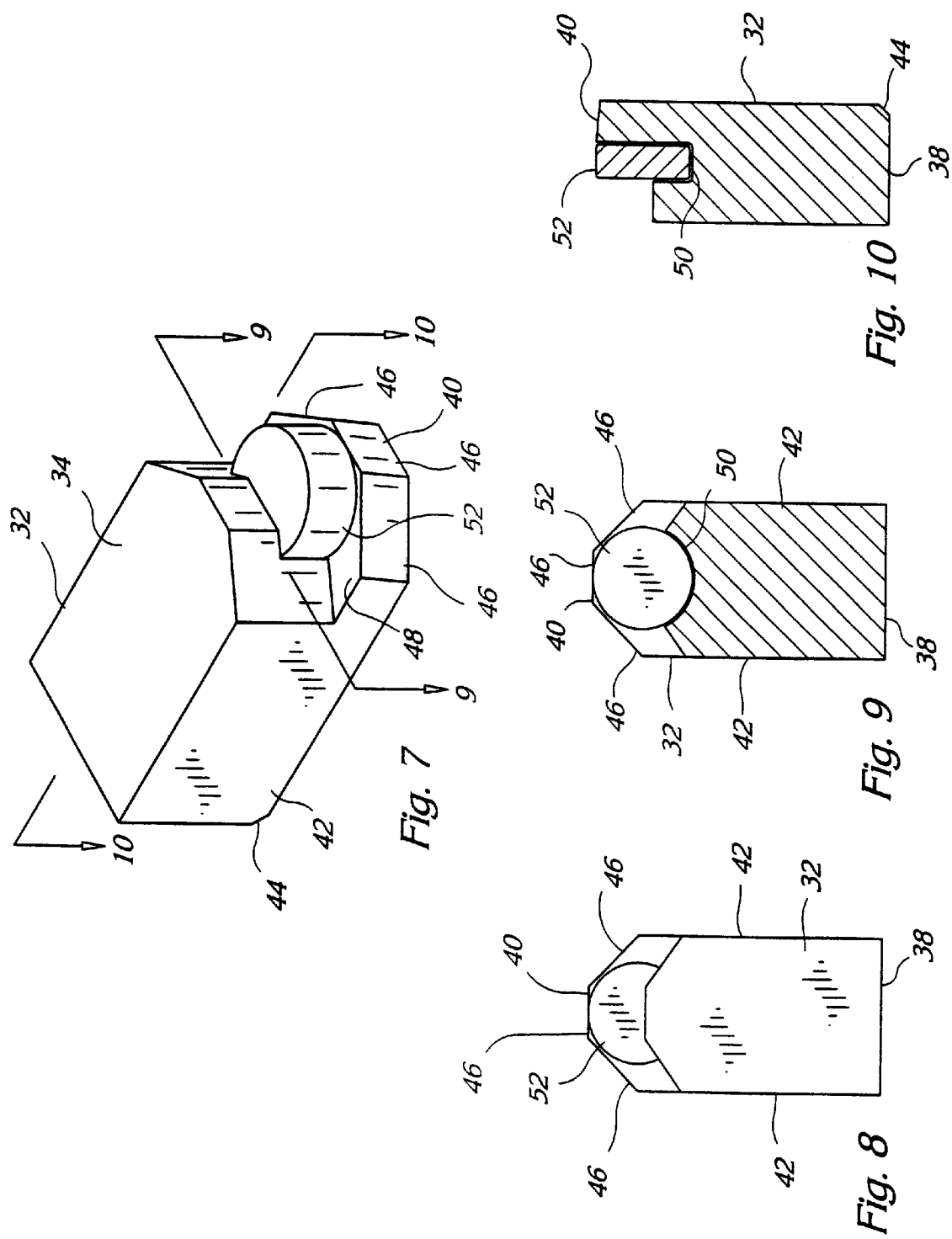

WEAR RESISTANT INSERT FOR BALLING DRUM ASSEMBLY

BACKGROUND OF THE INVENTION

1. Field of the Invention

The present invention relates to a balling drum assembly including a wear resistant insert. More particularly, the present invention relates to a wear resistant insert for a scraping assembly of the balling drum assembly.

2. Description of the Related Art

A balling drum assembly for a pelletizing plant typically includes a drum member of the type in which an agglomerative material is admitted at one end of the drum member and during rotation of the drum member forms nodules or balls which are discharged at the other end of the drum member. Within the drum member the agglomerative material forms a layer which adheres to the inside of the drum member and on which the nodules as well as the admitted agglomerative material are rolling. The layer of agglomerative material tends to increase in thickness and eventually to drop and it is therefore important to maintain the thickness of the layer of agglomerative material at a suitable constant value to render possible formation of nodules in the desired manner.

The rotary balling drum assembly includes a scraping assembly for maintaining the constant layer of agglomerative material in the nodulizing drum member. The scrapers typically consist of, for example, steel and are mounted on an attachment extending from a stationary member which is adjustable relative to the axis of rotation of the drum member. The primary purpose of the adjustability is to render possible adaptation of the distance of the scrapers from the inside of the drum member and consequently control of the thickness of the layer of agglomerative material. In order to render possible exchange of the scrapers, they may be detachably connected to the attachment or attachments; such as by means of welding or screw and nut joints.

It will be appreciated that the agglomerative material is typically abrasive and acts to wear the scraping assembly eventually requiring replacement of the scraping assembly.

One aspect of the present invention is to provide a scraping assembly that is more resistant to wear. Another aspect of the present invention is to provide a wear resistant insert for a scraping assembly of a balling drum assembly.

SUMMARY OF THE INVENTION

Briefly, according to the present invention there is provided a balling drum assembly. The balling drum assembly includes an inclined rotary drum member having an inlet at its one end for receiving agglomerative material and at its other end an outlet for balls formed from the agglomerative material. At least one scraper blade assembly is operatively attached to the drum member parallel to the axis of rotation of the drum member. Each scraper blade assembly includes a blade support member and separate blade segments secured eccentrically to the blade support member with respect to the axis of rotation of the drum member. Each blade segment includes an inner end and a back end, the inner end of each blade segment includes a notch formed therein to accept a similarly shaped wear resistant insert having a top face, bottom face, rear face, forward face and side faces. The top face of the wear resistant insert is offset from the bottom face to form a seat having a substantially flat planar seating surface and a curved rear wall and three planar forward edges formed by the forward face. In a preferred embodiment, a forwardly facing portion of the top face projects over the seat above the curved rear wall to form a housing for receiving the wear resistant member.

BRIEF DESCRIPTION OF THE DRAWINGS

Further features and other aspects of this invention will become clear from the following detailed description made with reference to the drawings in which:

FIG. 5 is a perspective view of a scraper blade segment of the scraper assembly including a wear resistant insert;

FIG. 6 is an exploded view of the scraper blade segment and wear resistant insert of FIG. 5;

FIG. 7 is a perspective view of a wear resistant insert in accordance with the present invention;

FIG. 8 is a top view of the wear resistant insert of FIG. 7;

FIG. 9 is a cross sectional view of the wear resistant insert of FIG. 7 taken along line 9—9; and FIG. 10 is a cross sectional view of the insert of FIG. 7 taken along line 10—10;

DESCRIPTION OF THE PREFERRED EMBODIMENT

Figure 1:
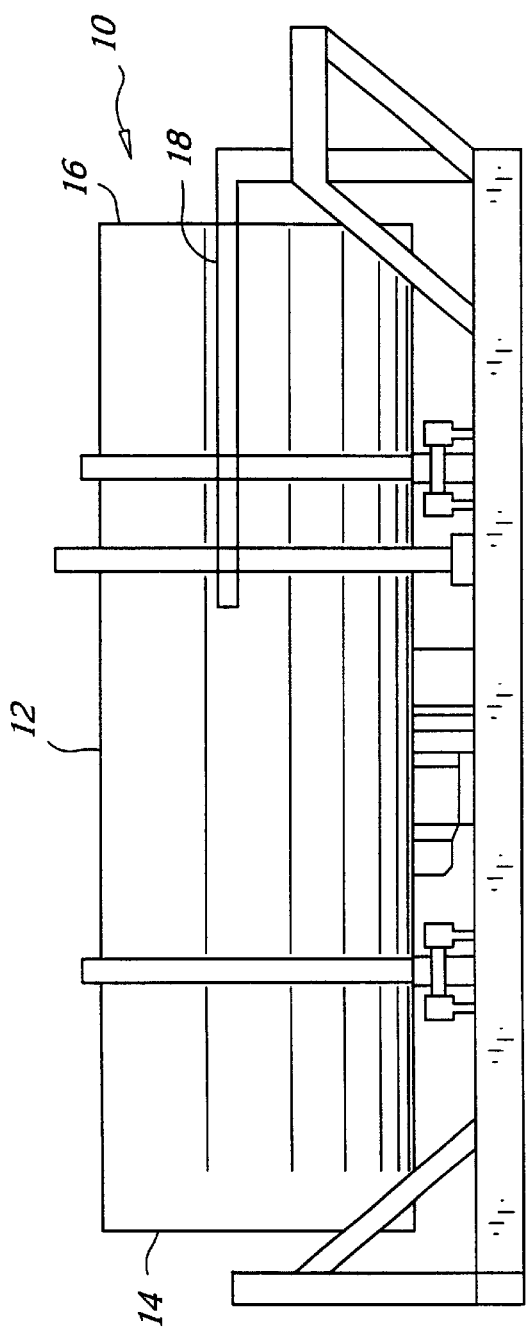
FIG. 1 is a side view of a balling drum assembly including a scraper assembly in accordance with the present invention.
Figure 2:
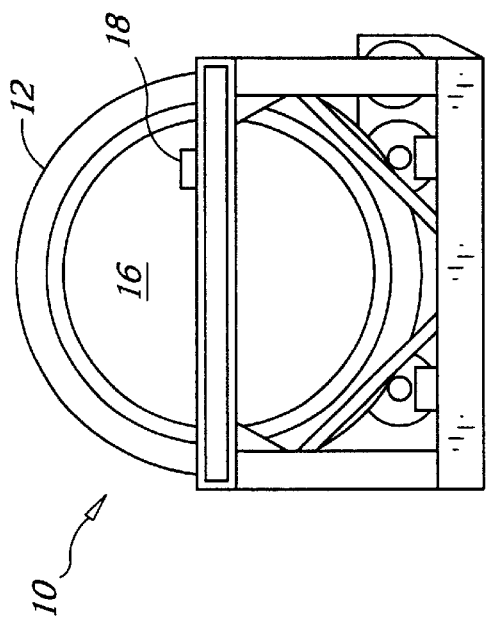
FIG. 2 is an end view of the balling drum assembly of FIG. 1.
Figure 3:
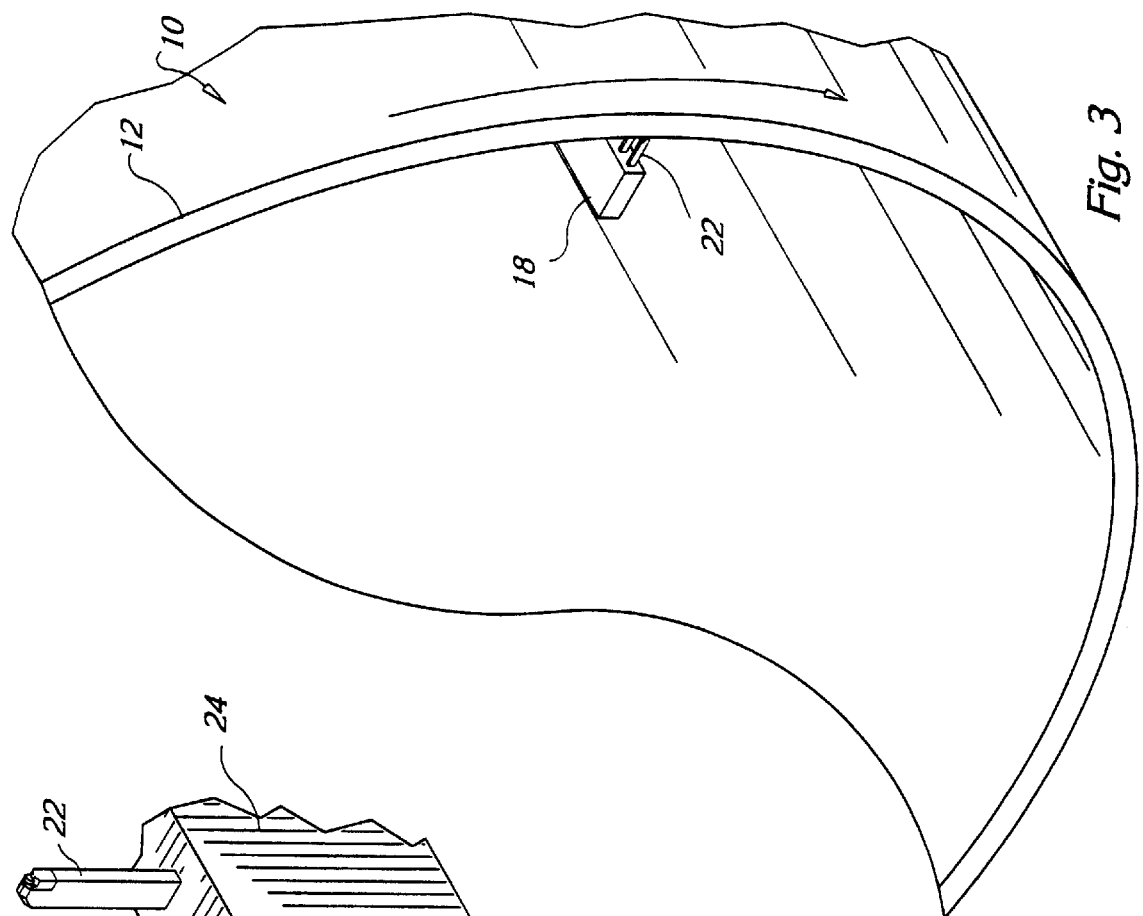
FIG. 3 is an enlarged partial fragmentary view of the scraper assembly inside of the balling drum assembly.

Referring to the drawings, wherein like reference characters represent like elements, there is shown in FIGS. 1–3 a balling drum assembly 10. The balling drum assembly 10 includes an inclined drum member 12 having an inlet portion 14 for receiving agglomerative materials and an outlet portion 16 for discharging the formed agglomerated product. At least one scraper assembly 18 is supported in the drum member 12 that is rotated by a drive mechanism as well known in the art.

It will be appreciated that most any number of scraper assemblies 18 may be supported in the drum member depending upon a number of factors, including the type of agglomerative material, size of balls or nodules to be formed and diameter of the drum member 12. In a preferred embodiment, one scraper assembly 18 is supported in the drum member 12.

Figure 4:
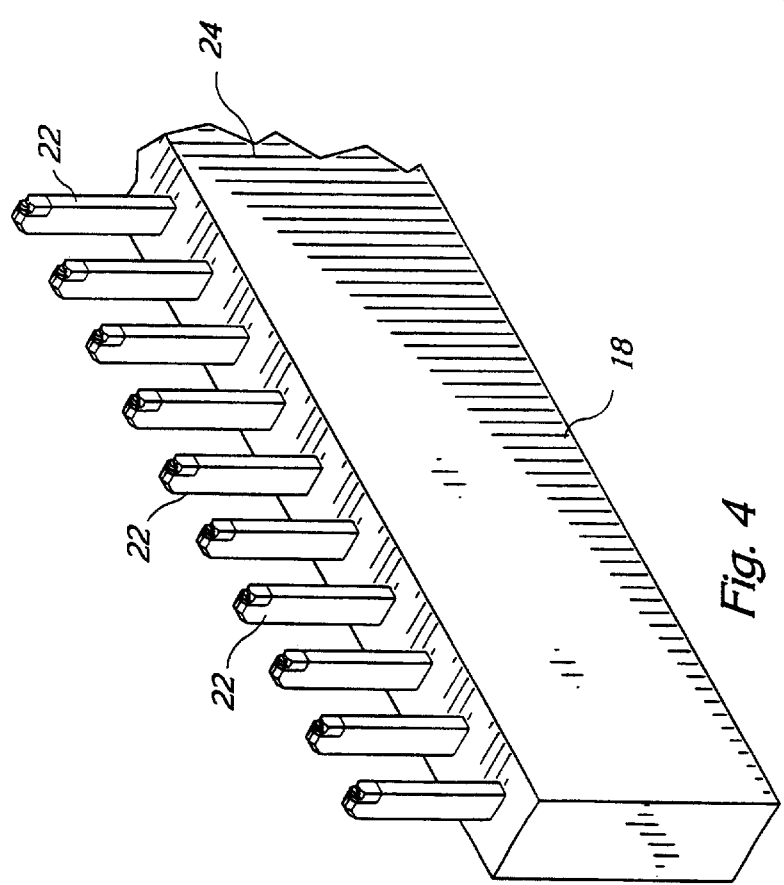
FIG. 4 is a partial perspective view of the scraper blade assembly.

Referring to FIGS. 3 and 4, each scraper assembly 18 includes a plurality of scraper blades 22 that are operatively secured about the inner circumference of the drum member 12. The plurality of scraper blades 22 extend over a portion of the longitudinal length of the drum member 12 to form elongated continuous cutting surfaces along substantially the entire length of the scraper blade assembly 18. The scraper blade assembly 18 provides symmetrical ridges and valleys in the layer of agglomerative material deposited on the drum member inner peripheral wall to aid in the mixing and agglomeration of the agglomerative materials.

Each scraper blade assembly 18 includes a blade support member 24 and a plurality of scraper blades 22 secured to the blade support. The scraper blades 22 may be attached to the blade support member 24 by welding or interference fit within an opening in the blade support member. As shown in FIGS. 5 and 6, each scraper blade 22 segment includes an inner end 26 and a back end 28. In a preferred embodiment, each scraper blade 22 is formed of AISI type 316L stainless steel. The back end 28 of each scraper blade segment 22 is secured to the blade support member 24 by means well known in the art as previously described. The scraper blade segments 24 are disposed eccentrically with respect to the axis of rotation of the drum member 12 and can be adjusted at such a distance from the inside of the drum that a layer of agglomerative material of a desired thickness can be maintained. The forward facing inner end 26 of each scraper blade segment 22 includes a notch 30 formed therein. The notch 30 is configured to accept a wear resistant insert 32.

Referring to FIGS. 7–10, there is shown a wear resistant insert 32 in accordance with the present invention. The wear resistant insert 32 includes a top face 34, bottom face 36, rear face 38, forward face 40 and side faces 42. The bottom face 36 and top face 34 are interconnected by the side faces 42 and extend forwardly from the rear face 38 to the forward face 40. In a preferred embodiment, the corner 44 formed by the rear face 38 and bottom face 36 is chamfered. As shown in FIG. 7, the top face 34 and the bottom face 36 include three linear forward edges to form three planar sides 46 in the forward face 40.

The top face 34 is offset from the bottom face 36 to form a seat 48 within the forward face 40. In a preferred embodiment, the seat 48 includes a substantially flat planar seating surface having a curved rear wall 50 and three linear forward edges 46 formed by the forward face 40. As shown in FIGS. 7, 8 and 10, a forwardly facing portion of the top face 34 preferably projects over the seat 48 above the curved rear wall 50 to form a housing for receiving a wear resistant member 52.

In a preferred embodiment, the wear resistant member 52 comprises a polycrystalline diamond (PCD) compact. The polycrystalline diamond compact is brazed within the housing to the seat. The polycrystalline diamond compact may be of most any suitable shape as desired. In a preferred embodiment, the polycrystalline diamond compact is of a generally cylindrical shape to fit within the curved rear wall 50 of the housing.

A polycrystalline diamond compact typically consists of an abrasive layer comprising a polycrystalline diamond layer (PCD layer) bonded to a cemented tungsten carbide substrate. The PCD layer is believed to be 100% polycrystalline diamond. It is anticipated that other schemes of layers and compositions would be appropriate to use for this invention. U.S. Pat. No. 4,694,918 to Hall discloses some such schemes including a scheme using several layers having different contents of polycrystalline diamond.

The wear resistant insert 32 is preferably formed of cobalt cemented tungsten carbide. More specifically, typical compositions of the cobalt cemented tungsten carbide have between about 5 and about 15 weight percent cobalt with the balance being tungsten carbide. The grain size of the tungsten carbide may range between about 1 micrometer to about 12 micrometer. The wear resistant insert 32 may optionally include additives such as transition metal carbides. The preferred cobalt cemented tungsten carbide has 6 weight percent cobalt with the balance being tungsten carbide having a grain size between about 1 micrometer to about 12 micrometer. The wear resistant insert 32 is brazed into the notch 30 formed in the scraper blade segment 22.

One preferred braze alloy comprises EASY FLO 3 braze alloy available from Handy & Harman, Inc., 859 Third Avenue, New York N.Y. 10022. EASY FLO 3 braze alloy is composed of 50 nominal weight percent Ag, 15.5 nominal weight percent Cu, 15.5 nominal weight percent Zn, 16 nominal weight percent Cd, and 3 nominal weight percent Ni. Further information on EAST FLO 3 braze alloy can be found in The Brazing Book, Pages 32–33 available from Handy & Harman, Inc.

Briefly, the mode of operation of the balling drum assembly 10 is as follows. The agglomerative materials are admitted into the drum member 12 at the inlet end 14 thereof where it form a layer on the inside of the drum member which layer increases in thickness according as more agglomerative materials are fed into the drum. Due to the inclination and rotation of the drum member 12 the agglomerative materials travel toward the outlet end 16 of the drum member resulting in the formation of nodules or balls from the agglomerative materials which nodules are successively increasing in size-as-they travel toward the outlet end. The scraper blade assemblies 18 prevent the layer of agglomerative materials from increasing to a thickness such that the agglomerative materials would drop in the form of big lumps from the inside of the drum member 12. Instead, the scraper blade assemblies 18 maintain an adequately thick layer of agglomerative material. As the drum member 12 is rotating the scraper blade assemblies effect a scraping operation due to the fact that the rows of scraper blade segments 22 successively engage the layer of agglomerative material and remove agglomerative material at the places where this layer is too thick. Due to the shape of the blade segments 22 and due to the fact that a row of blade segments are equally spaced apart within the drum member 12 a very uniform layer of agglomerative material can be maintained on the inside of the drum member.

While the invention has been specifically described in connection with certain specific embodiments thereof, it is to be understood that this is by way of illustration and not of limitation, and the scope of the appended claims should be construed as broadly as the prior art will permit.

What is claimed is:

1. A balling drum assembly comprising:
   an inclined drum member having an axis of rotation,
   at least one scraper blade assembly operatively attached to the drum member and parallel to the axis of rotation of the drum member, each scraper blade assembly including a blade support member and separate scraper blade segments secured eccentrically to the blade support member with respect to the axis of rotation of the drum member, each blade segment including an inner end and a back end, the inner end of each blade segment including a notch formed therein to accept a wear resistant insert, the wear resistant insert having a top face, bottom face, rear face, forward face and side faces wherein the top face is offset from the bottom face to form a seat within the forward face and having a seating surface and a curved rear wall for receiving a wear resistant member.

2. The balling drum assembly of claim 1 comprising a plurality of scraper blade assemblies.

3. The balling drum assembly of claim 2 wherein the scraper blade assemblies are positioned equidistantly around the inner circumference of the drum member.

4. The balling drum assembly of claim 1 wherein a corner formed by the intersection of the rear face and the bottom face is chamfered.

5. The balling drum assembly of claim 1 wherein the top face and the bottom face include three linear forward edges to form three planar sides in the forward face.

6. The balling drum assembly of claim 1 wherein the seating surface is a substantially flat planar seating surface.

7. The balling drum assembly of claim 1 wherein the wear resistant insert is formed of cobalt cemented tungsten carbide.

8. The balling drum assembly of claim 1 wherein the wear resistant member is a polycrystalline diamond compact.

9. The balling drum assembly of claim 1 wherein a forwardly facing portion of the top face projects over the seating surface above the curved rear wall to form a housing.

10. A balling drum assembly comprising:

an inclined drum member having an axis of rotation, a plurality of scraper blade assemblies operatively attached to the drum member and parallel to the axis of rotation of the drum member, each scraper blade assembly including a blade support member and separate scraper blade segments secured eccentrically to the blade support member with respect to the axis of rotation of the drum member, each blade segment including an inner end and a back end, the inner end of each blade segment including a notch formed therein to accept a wear resistant insert, the wear resistant insert having a top face, bottom face, rear face, forward face and side faces wherein the top face is offset from the bottom face to form a seat within the forward face and having a substantially flat planar seating surface and a curved rear wall, a forwardly facing portion of the top face projecting over the seating surface above the curved rear wall to form a housing for receiving a wear resistant member.

11. The balling drum assembly of claim 10 wherein a corner formed by the intersection of the rear face and the bottom face is chamfered.

12. The balling drum assembly of claim 10 wherein the top face and the bottom face include three linear forward edges to form three planar sides in the forward face.

13. The balling drum assembly of claim 10 wherein the wear resistant insert is formed of cobalt cemented tungsten carbide.

14. The balling drum assembly of claim 10 wherein the wear resistant member is a polycrystalline diamond compact.

15. A wear resistant insert for a balling drum assembly including an inclined drum member having an axis of rotation, a plurality of scraper blade assemblies operatively attached to the drum member and parallel to the axis of rotation of the drum member, each scraper blade assembly including a blade support member and separate scraper blade segments secured eccentrically to the blade support member with respect to the axis of rotation of the drum member, each blade segment including an inner end and a back end, the inner end of each blade segment including a notch formed therein to accept the wear resistant insert wherein the wear resistant insert comprises a top face, bottom face, rear face, forward face and side faces, the top face is offset from the bottom face to form a seat within the forward face and having a seating surface and a curved rear wall for receiving a wear resistant member.

16. The wear resistant insert of claim 15 wherein a corner formed by the intersection of the rear face and the bottom face is chamfered.

17. The wear resistant insert of claim 15 wherein the seating surface is substantially flat.

18. The wear resistant insert of claim 15 formed of cemented tungsten carbide.

19. The wear resistant insert of claim 15 wherein a forwardly facing portion of the top face projects over the seating surface above the curved rear wall to form a housing for receiving a wear resistant member.

\* \* \* \* \*